(12) United States Patent
Smith

(10) Patent No.: US 6,895,585 B2
(45) Date of Patent: May 17, 2005

(54) METHOD OF MIXED WORKLOAD HIGH PERFORMANCE SCHEDULING

(75) Inventor: Gary Stephen Smith, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 09/823,837

(22) Filed: Mar. 30, 2001

(65) Prior Publication Data

US 2002/0143847 A1 Oct. 3, 2002

(51) Int. Cl.[7] .............................. G06F 9/46; G06F 15/16
(52) U.S. Cl. ..................... 718/103; 718/100; 718/102; 709/202; 709/203; 709/207
(58) Field of Search ................................. 709/100, 101, 709/102, 103, 104, 105, 106, 107, 200, 226, 201, 202, 203, 207; 710/5, 10, 54; 718/100, 101, 102, 103, 107, 108

(56) References Cited

U.S. PATENT DOCUMENTS

| 5,506,969 | A | * | 4/1996 | Wall et al. ................... 710/107 |
| 5,946,498 | A | * | 8/1999 | Chiang et al. ................ 710/54 |
| 6,157,963 | A | * | 12/2000 | Courtright et al. ............. 710/5 |
| 6,438,629 | B1 | * | 8/2002 | Huebner et al. .............. 710/52 |
| 6,442,550 | B1 | * | 8/2002 | Rajamony ..................... 707/10 |
| 6,505,250 | B2 | * | 1/2003 | Freund et al. .............. 709/226 |
| 6,563,506 | B1 | * | 5/2003 | Wang ......................... 345/535 |

* cited by examiner

Primary Examiner—Majid A. Banankhah (57) ABSTRACT

A method of scheduling in a mixed workload environment. A high priority workload requiring bounded response times is executed on the same system with a low priority workload that is capable of tying up the CPU and multiple volume storage resources of the system by causing multiple concurrent I/O operations, thereby increasing the response times of the high priority workload beyond acceptable bounds. The method of scheduling prevents the response times of the high priority workload from increasing beyond the acceptable bounds by deferring the dispatch of processes servicing the current low priority workload for a time that depends on the priority of the low priority work and by not performing concurrent I/O operations that are requested by the current low priority work, when there is sufficient higher priority activity on the storage resource.

13 Claims, 9 Drawing Sheets

METHOD OF MIXED WORKLOAD HIGH PERFORMANCE SCHEDULING

CROSS-REFERENCE TO RELATED APPLICATIONS

1. Field of the Invention

The present invention relates generally to scheduling processes in an operating system and more particularly to scheduling of processes assigned to different types of workloads.

2. Description of the Related Art

Many operating systems today use a priority-based design to schedule processes on one or more available processors. In such systems each process has a scheduling priority that changes with time. The highest priority process that is ready to run is the process that is selected for dispatch on the CPU. Processes that are CPU-bound have their priority decremented to prevent other processes from being denied a fair share of the CPU resource.

In a client-server arrangement of systems (or software), priority-based scheduling systems can pose problems that involve conflicts among the priority of client requests and the priority of server processes that service the client requests. In effect, there are two priority spaces that conflict with each other. For example, if a first client request arrives at a server and requests the use of a server process, the server process can appear to be a resource that is held by the client request, because the server process runs at a very high process priority on the server to service the client request in a timely manner. If a second client request, having a higher priority than the first client request, arrives at the server requesting the use of the same server process, a form of priority inversion occurs. The higher priority client request must wait behind the lower priority client request for service. Furthermore, any server processes having a priority higher than the first client request priority must wait for the server process to complete work on behalf of the lower priority client request. Such a situation is not conducive to low response times for high priority client requests and leads to unpredictable performance of processes on the server. Response times are especially important if the client requests are from real-time applications that require bounded response times.

To alleviate this problem, a form of priority inheritance is used. The server process that services the client requests is allowed to temporarily inherit the priority of the highest priority client request and is inserted, in priority order, on a queue of ready-to-run processes for the server. Preferably, the ready-to-run queue is priority-ordered by insertion sorting requests onto the queue. Upon reaching the head of the priority-sorted, ready-to-run queue, the server process is dispatched onto the CPU for execution, with its priority restored to normal high process priority. If, while the server process is waiting on the read-to-run queue, another client request arrives having a higher priority than the current client request, the server process priority is changed to the priority of the higher priority client request and its position on the ready-to-run queue is adjusted, thereby assuring that the highest priority client request is serviced before the lower priority client request. Also, other server processes of equal and higher priority relative to the priority of the client request are serviced by the server CPU before the lower priority client request is serviced. Requiring the server process for the client request to wait behind both equal and higher priority processes on the server, ensures that the scheduling policy is fair and the resulting performance is predictable. This is especially important for real-time applications such as transaction processing.

The above mechanisms work well when a single server process acts to service client requests. However, when multiple server processes (or threads) act on behalf of a client request, a new problem emerges. Each of these multiple processes has the same priority on the ready-to-run queue, that of the client request for which they are acting. This has the effect of changing the priority scheduling policy on the server into a form of time sharing policy because there is no priority among the multiple server processes acting on behalf of the same client request. Additionally, these multiple server processes cause an increase in context switching because they preempt other processes on the server.

This problem is solved by establishing a transaction priority for the server process based on the transaction priority of the client request. Multiple server processes acting on behalf of the client requests have their transaction priorities compared to determine the highest priority server process.

Another problem associated with priority-based scheduling is a request for an operating system service made during the processing of a lower priority request for the service. A request for a system service can cause the system service to become active for possibly extended periods of time on behalf of the lower priority request, during which a higher priority request for the service is ignored. Response times for real-time applications suffer in this environment. This problem is preferably solved by employing preemptable operating system services which permit a system service to quickly switch to servicing the higher priority request. Operating system service preemption assures that, in the client-server environment, client requests possibly from a real-time application and local requests for operating system services are not delayed while the service is active on behalf of a long running, lower priority request.

Real-time applications, such as transaction processing, can include workloads that have greatly differing characteristics. One type of workload, is the on-line transaction processing workload (OLTP), such as an automatic teller machine operation. Transactions in such a workload typically involve a small number of data blocks on a permanent storage device, have unpredictable arrival times and rates, comprise a number of short operations such as updating a table or inserting data into a table and require good, bounded response times R.

As used herein, response time R is the ratio of the number of requesters waiting and using a resource (or a system) N and the throughput of the resource or system X (the number of services completed at the resource or system per second), R=N/X. It is important to observe that as the number of requesters N increases, the throughput of the resource typically increases (due to increased efficiency from servicing more than one request), then saturates and in some cases, actually starts to decrease due to an increase in overhead that does not result in any increase in work at the resource. This causes the response time at the resource to increase in a possibly nonlinear manner near and beyond saturation. Thus, operating a resource in a system at or near saturation is to be avoided when bounds on system response times are important, as they are in real-time applications.

Another workload that is commonly encountered in a transaction processing application is a monitoring query (MQ) of the transaction database. Activity in monitoring query workloads is quite different from on-line transaction processing queries described above. Monitoring queries typically involve parallel queries to multiple permanent storage volumes that are attached to each CPU involved with the monitoring query. Lengthy operations, such as reading the entire transaction database, are common with this workload and the workload may be constantly present. The activity on multiple permanent storage volumes allows a great deal of parallelism, which can cause high levels of CPU activity. Often, read-aheads are performed on the multiple volumes which serve to keep the CPU utilization high during the processing of this workload and the read-aheads themselves involve reading a large number of blocks from the permanent storage devices thereby increasing the activity of the I/O subsystem managing the multiple volumes. Additionally, this workload requires real-time or near real-time access to the tables of the transaction processing system.

It is desirable to have both the OLTP workload (the higher priority workload) and the MQ workload (a lower priority workload) serviced by the same system because the system may have unused capacity with only the OLTP workload. However, the mixing of these two workloads creates a serious problem in a priority-based scheduling system such as the one described above. Mixing the two workloads can cause a serious degradation to the response times of the higher-priority OLTP workload. This degradation is caused because the lower-priority MQ workload makes very good use of the system CPU and permanent storage resources, causing them to operate at high utilization. (As mentioned above, this is to be avoided if good response times are required.)

In older systems, it has generally not been possible to operate the CPU and the permanent storage system so that the CPU resource and the storage system are nearly saturated. Furthermore, in these older systems, if any response time problems did occur, they were easily handled by simply relying on the arrival rate of the higher-priority OLTP workload requests to force the MQ workload to a lower utilization of the CPU resource.

However, with the advent faster CPUs and faster storage systems and concurrent programming models (such as threads, lightweight processes or helper processes within a process group) supported by the operating system, relying on the arrival rates of the OLTP workload requests to solve the problem is not workable. Concurrent programming models of such systems permit multiple concurrent I/O (permanent storage) operations across multiple volumes to be performed. When the processes that perform these multiple concurrent I/O operations are dispatched onto the server CPU, they are dispatched at the highest system process priority to assure that they will complete in a timely manner for the MQ process on the CPU. Thus, with the higher speed CPU resources and higher speed, multiple volume permanent storage systems, it is now possible to cause high utilizations of the storage subsystem and high utilizations of the CPU. Because the MQ workload is constantly present, there is never ending activity on the system from this workload. This causes a problem for the higher priority OLTP workload, because, upon arrival, the OLTP workload requests must preempt the lower priority MQ work currently in progress and attempt to perform the transaction requested while the permanent storage system and CPU resource are both still processing concurrent I/O operations for the MQ workload. The result is poor response times for the OLTP workload because the transactions of this workload are serviced in an environment in which both the CPU resource and permanent storage have high utilizations. As mentioned above, such an environment is not conducive to bounded response times.

Therefore, a solution is needed that allows the OLTP (or similar) and MQ (or similar) workloads to concurrently execute on the same system without substantial interference to each other when the system has a multiple-volume, permanent storage system capable of causing high CPU utilizations and storage system utilizations while processing the MQ or similar workload.

BRIEF SUMMARY OF THE INVENTION

The present invention is intended to meet the above need. A method of scheduling in a mixed workload environment, in accordance with the present invention, includes the following steps. While executing a current process on the CPU resource and the storage resource, where the current process has been dispatched to service a current client request, a contention check is performed to determine whether a new client request has a transaction priority that is greater than the transaction priority of the current client request. If the transaction priority of the new client request is greater than that of the current request, a process is dispatched to service the new client request.

If the transaction priority of the new request is not greater than that of the current request, the transaction priority of the current request is tested to determine whether it is less than a predetermined threshold priority. If the transaction priority of the current client request is lower than the predetermined threshold priority and there is higher priority I/O activity present on the storage resource, then the servicing of the current client request is delayed, the servicing of any read aheads for the current client request is forgone, and a process to service the highest priority client request that is available for service is dispatched.

If the transaction priority of the current client request is greater than the predetermined threshold or the priority of the current client request is lower than the predetermined threshold but there is no higher priority I/O activity present on the storage resource, then whether the current client request requires any read aheads is determined, one or more helper processes is dispatched to service any required read aheads, and control is returned to the current process to service the current client request.

In one embodiment the delay in servicing the current client request is a fixed amount of time. In another embodiment the delay in servicing the current client request is equal to the sum of a fixed amount of time and a priority dependent amount of time. The priority dependent time is the product of a constant and the difference between the threshold priority and the priority of the ready-to-run process, thereby causing current client requests having a higher priority to be delayed less than those having a lower priority.

An advantage of the present invention is that the response time of the higher priority workload such as an OLTP workload is not substantially affected by the presence of the lower priority workload.

Another advantage of the present invention is that the user of the system can adjust the priority of the lower priority workload to meet the requirements of that workload while controlling the impact on the response times of the higher priority workload.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
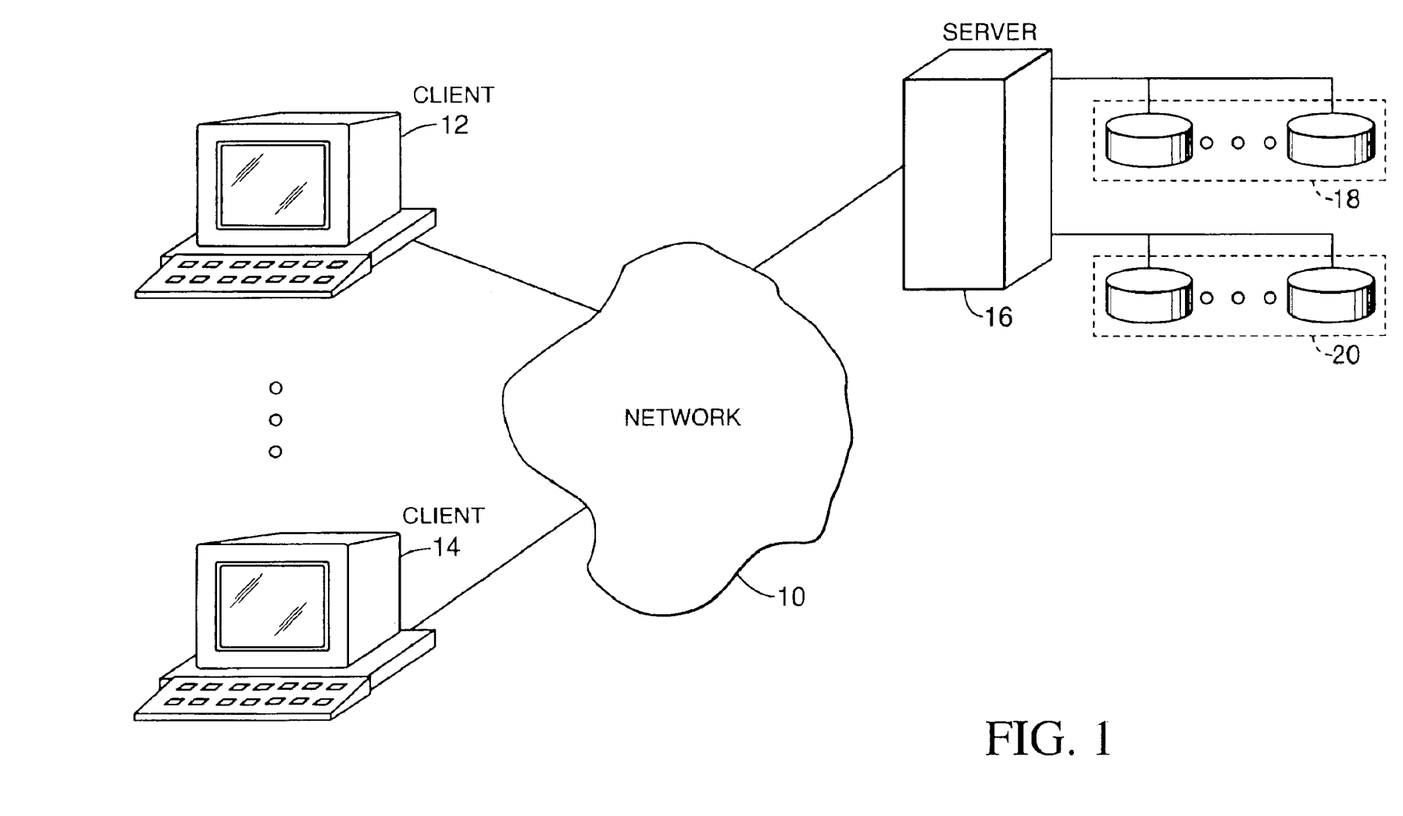
FIG. 1 shows a system setting of the present invention.

FIG. 1 shows a system setting of the present invention. In this setting a network 10 interconnects one or more clients 12, 14 and a server system 16. The network can be a public network such as the Internet or a private network such as a local area network. The server has one or more processing units (not shown), each of which is connected to a plurality of storage volumes 18, 20.

Figure 2:
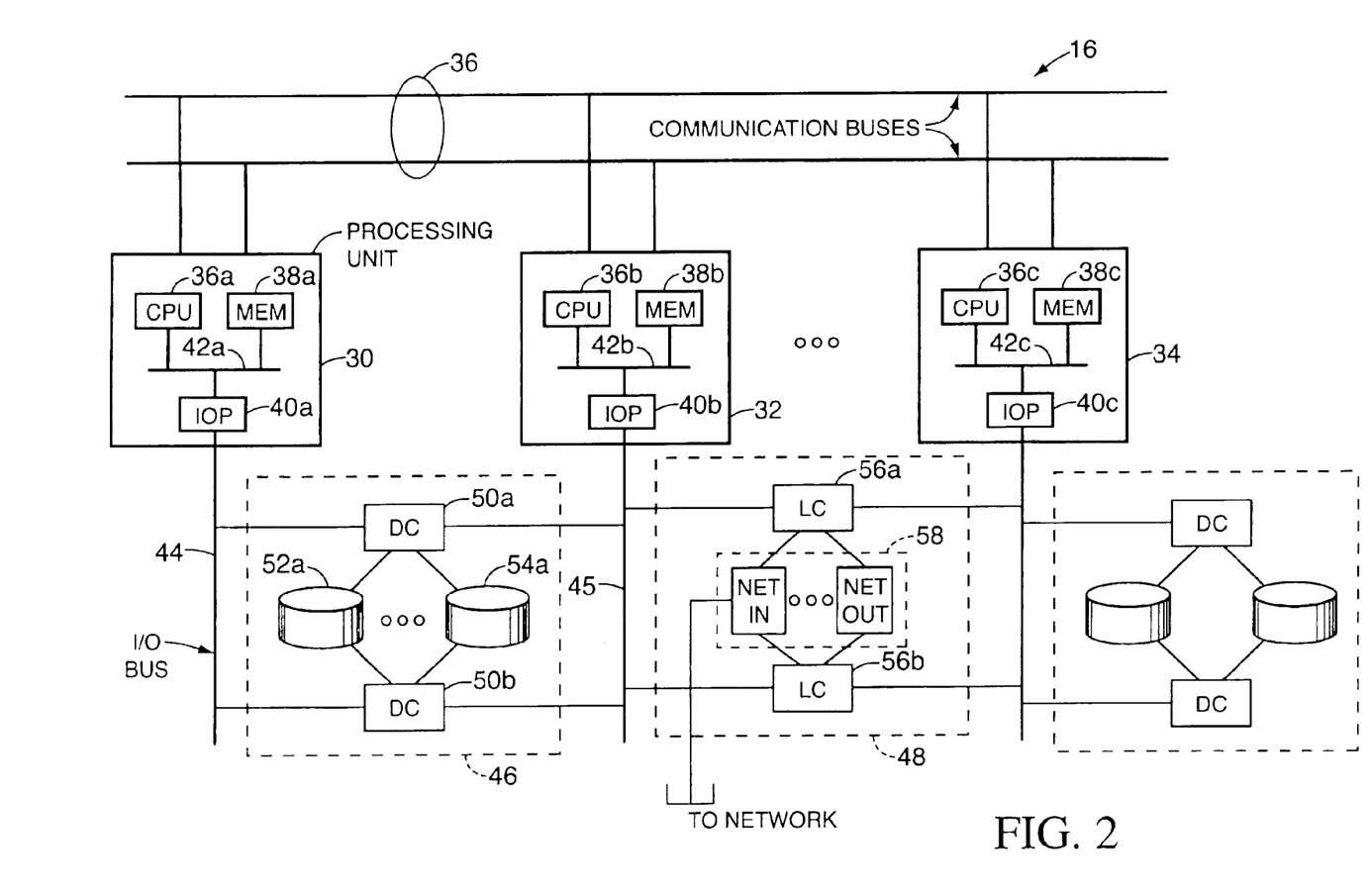
FIG. 2 shows a server architecture for the server depicted in FIG. 1.

FIG. 2 shows a server architecture for the server 16 depicted in FIG. 1. Typically, processing unit pairs 30, 32 or 32, 34 are interconnected by a communication bus 36 and each processing unit 30, 32, 34 has a CPU 36a–c, interconnected via a bus 42a–c to memory 38a–c and I/O Processor (IOP) 40a–c, respectively, which connects via an I/O bus 44 45, to an I/O subsystem such as a permanent storage system 46 or a local area network system 48. Disk controllers (DC) 50a–b are dual-ported to connect to the IOP 40a–b in each processing unit 30, 32, 34 of a processing unit pair to provide a redundant connections to the permanent storage system 46, which comprises one or more storage volumes 52a, 54a. LAN Controllers (LC) 56a–b are also dual-ported to connect to the IOP 40b–c in each processing unit 32, 34 of a processing unit pair to provide redundant connections to the local network subsystem 58.

Figure 3:
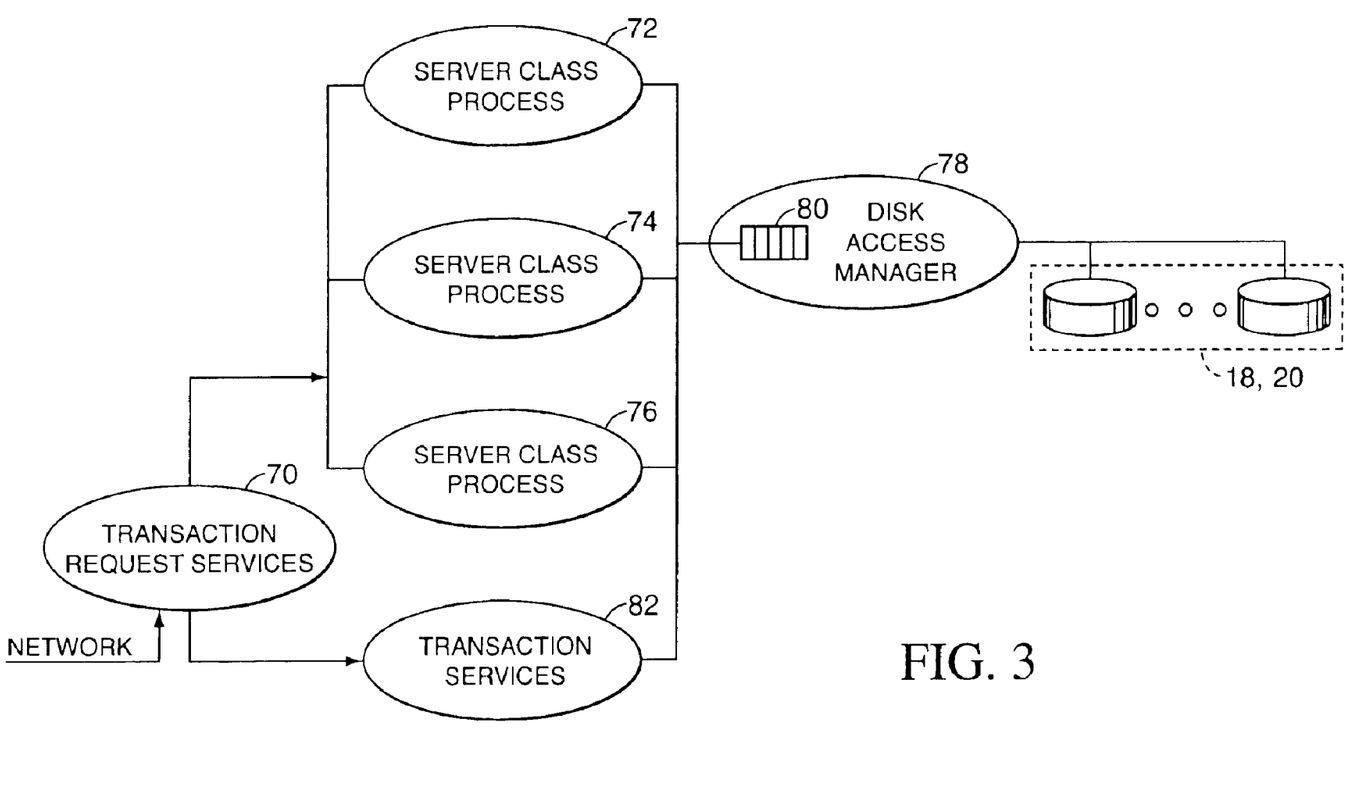
FIG. 3 shows the process environment for servicing high priority transaction requests.

FIG. 3 shows the process environment for servicing high priority transaction requests. These requests typically arrive via the network from a client system connected to the network or from a client connected locally to the processing unit of FIG. 2. A transaction request services process 70 forwards the client request to one of the server class processes 72, 74, 76 which then processes the request. In so doing, the server class process may require the services of the disk access manager. When the disk access manager service is required a message is sent from the server class process to the disk access manager input queue 80, which then processes the request on behalf of the client. Transaction services process 82 carries out the two-phase commit protocol commonly used in transaction processing.

Figure 4:
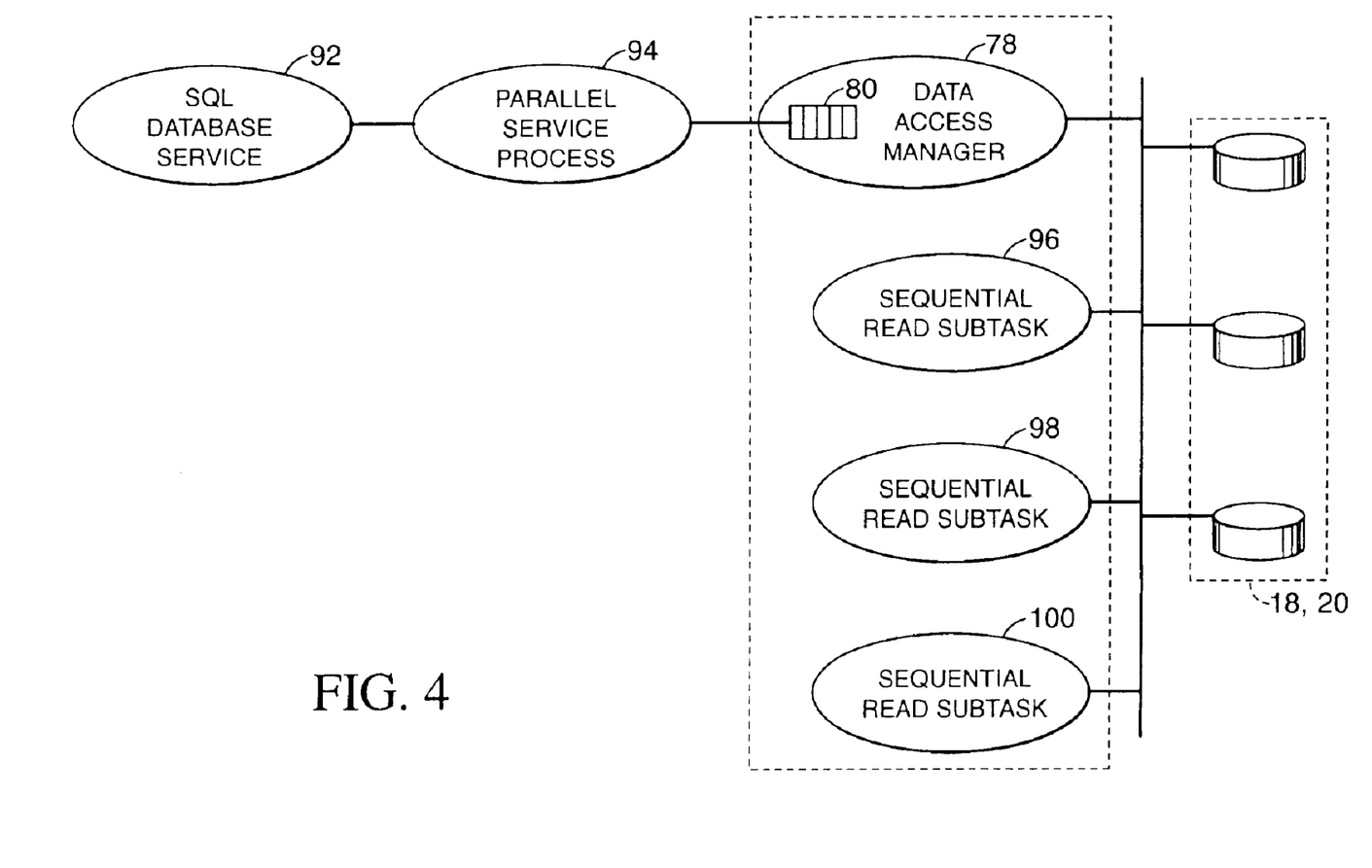
FIG. 4 shows the process environment for servicing lower priority monitoring queries.

FIG. 4 shows the process environment for servicing lower priority monitoring queries. These queries arrive via the SQL database services process 92 and are sent to a parallel service process 94, which then requests the services of the data access manager 78. Included within the process group of the data access manager are one or more helper processes (or threads) 96, 98, 100 that are used for performing concurrent sequential reads if required by the monitoring query.

Figure 5:
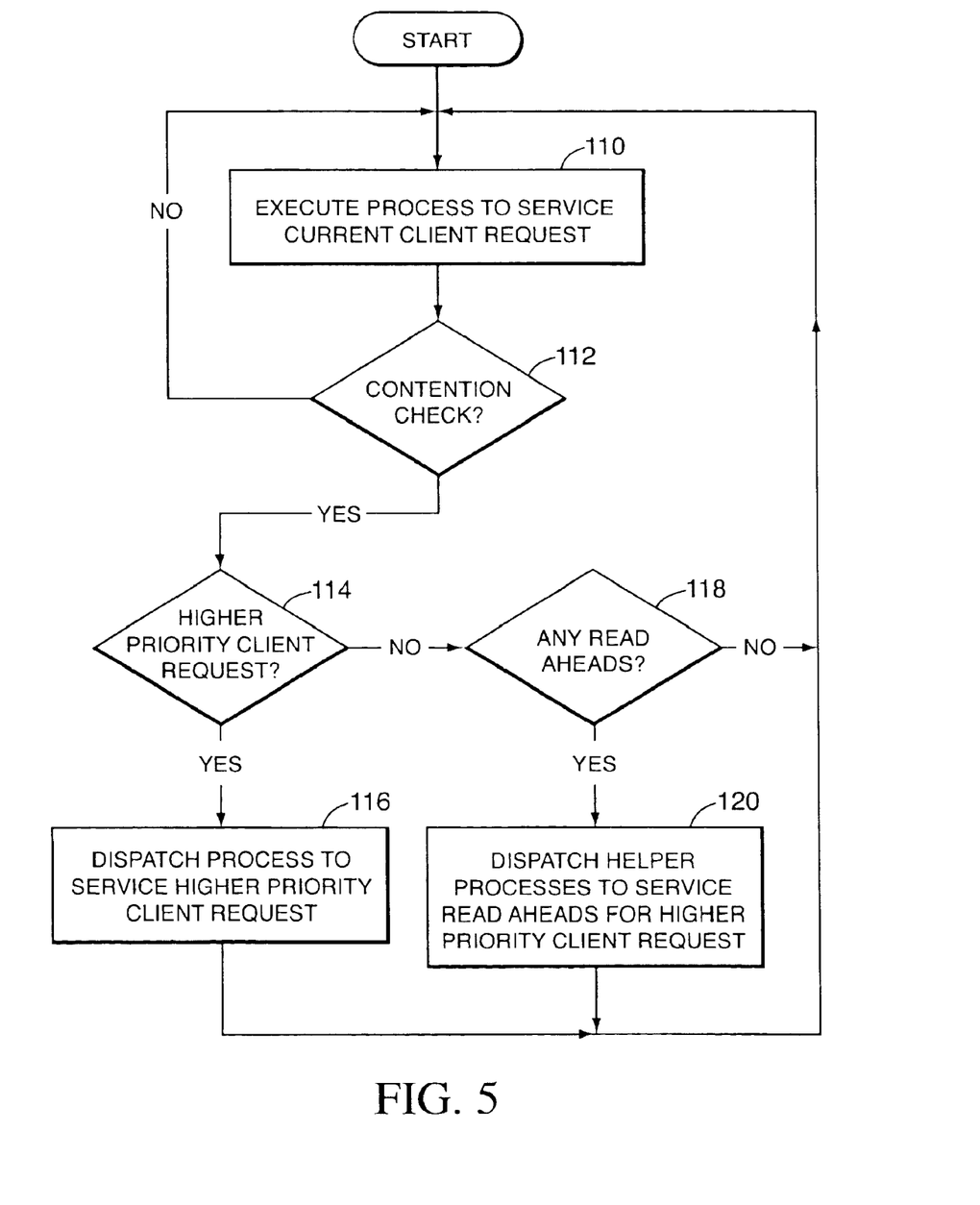
FIG. 5 shows a flow chart of the scheduling process for requests to the disk access manager process without the benefit of the present invention.

FIG. 5 shows a flow chart of the scheduling process for requests to the disk access manager process without the benefit of the present invention. In this flow chart, while the disk access manager is servicing a current client request in step 110, a contention check is made in step 112. If there is a higher priority client request as determined in step 114, the disk access manager process is dispatched onto the CPU for the higher priority client request in step 116. If there is no higher priority client request as determined in step 114, then a test is made determine whether the current client request requires any read aheads, in step 118. If no read aheads are required, then the execution of the process to service the current client request continues. If there are any read aheads required to service the client request, these are handed off to the helper processes, which are then dispatched onto the CPU in step 120 at a very high process priority to assure that the read ahead is performed by the time the data for the read ahead is needed by the parallel service process. Also, once started, it is difficult and undesirable to stop the read aheads. Thus, from a practical standpoint, the read aheads must be allowed to complete after they are started.

Figure 6:
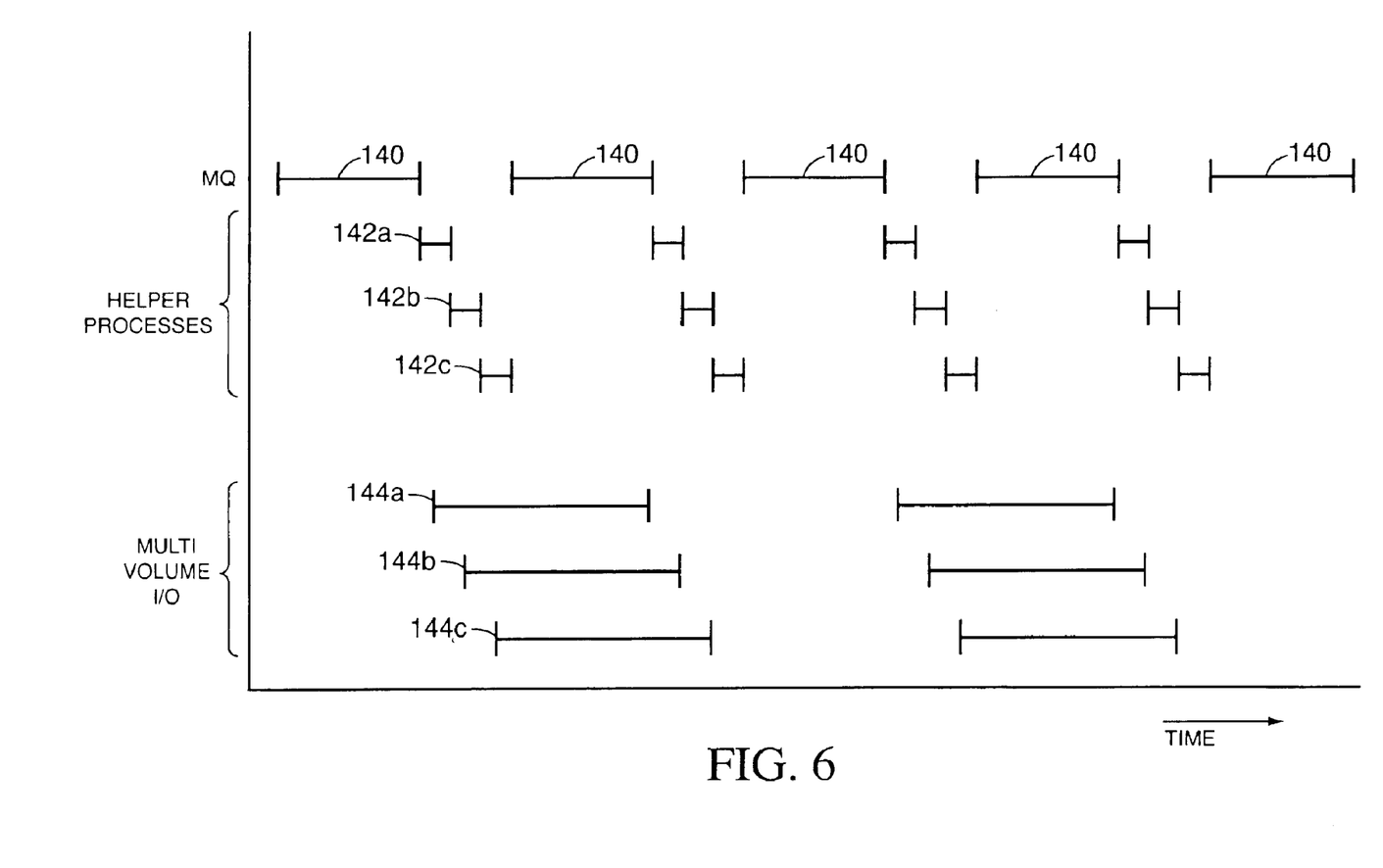
FIG. 6 shows an event diagram depicting the scheduling of the lower priority monitoring queries.

FIG. 6 shows an event diagram depicting the scheduling of the lower priority monitoring queries in accordance with the flow chart of FIG. 5. When a client request for a monitoring query arrives, the parallel service process 140 is dispatched on behalf of the client request and data access management requests are made as needed. This causes one or more helper processes 142a–c to manage read aheads 144a–c for the monitoring query MQ 140 which results in concurrent I/O operations 144a–c on the permanent storage volumes connected to the processing unit. As is evident from the event diagram, CPU utilization and storage volume utilization can be high when there are numerous read aheads active. In one case, when there are mirrored volumes, five read aheads can become active and if the volumes are not mirrored three read aheads are active.

Figure 7:
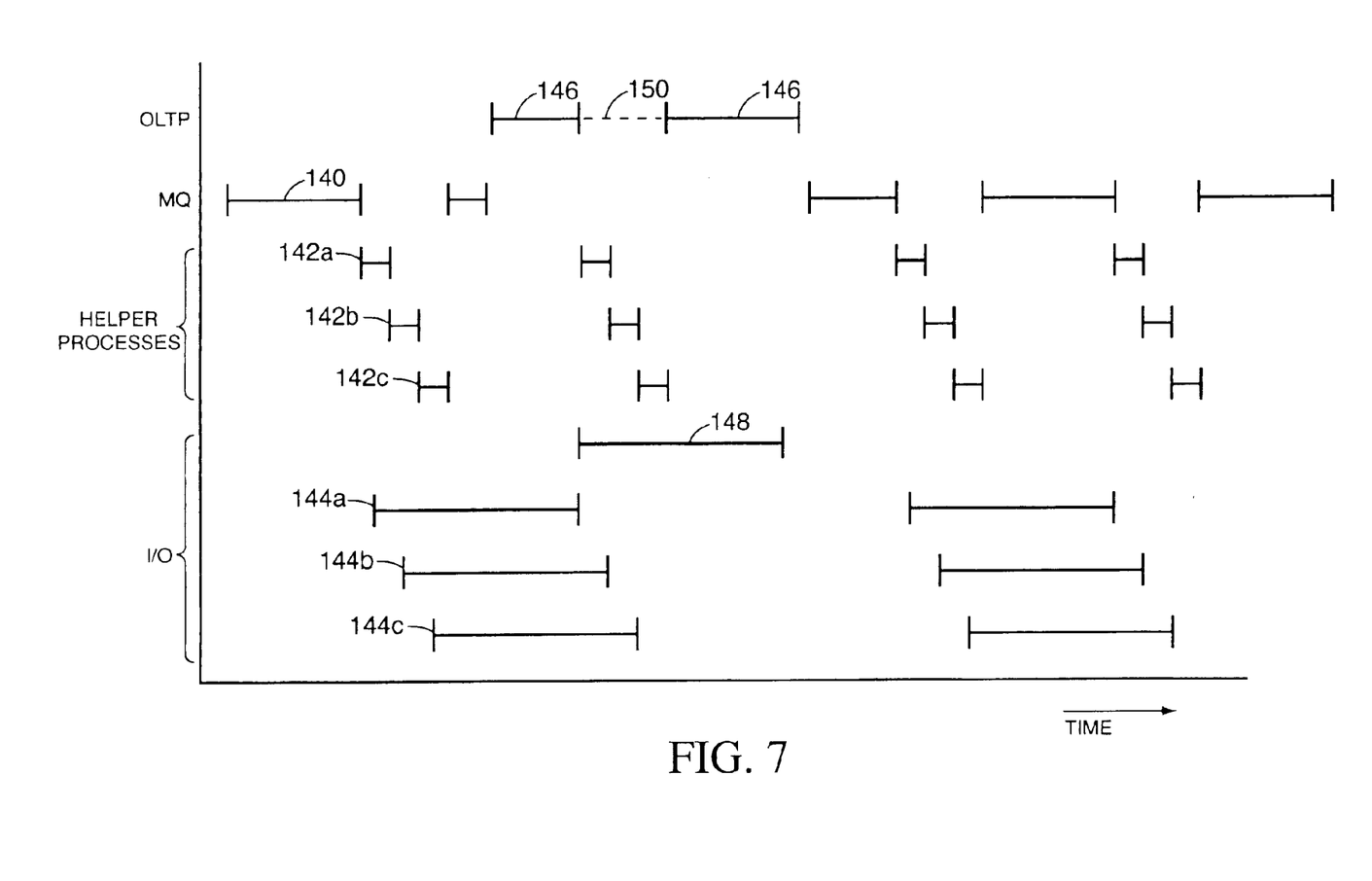
FIG. 7 shows an event diagram depicting the scheduling of a high priority transaction request during the processing of a lower priority monitoring query.

FIG. 7 shows an event diagram depicting the scheduling of a high priority transaction request during the processing of a lower priority monitoring query request. This event diagram shows how an OLTP client request is handled according to the flow chart of FIG. 5. Low priority monitoring query client requests are handled as described above and a higher priority transaction request 146 (and its I/O 148) are processed according to the process environment of FIG. 3 when it arrives. This causes delays in the processing of the high priority transaction request 146 mainly because of the read ahead activity in the storage system that is occurring on behalf of the lower priority monitoring query, but also because the CPU in the processing unit is required to service the read aheads as they complete. This servicing is a very high process priority, as mentioned above, thus interfering and delaying 150 the processing of the transaction request 146. As described above, monitoring queries are a type of workload that may be constantly present, which means that there are few, if any, extended periods of time during which the CPU and I/O subsystems have low enough utilization that the transaction workload experiences good response times. Thus, there is a problem with the response times of the transactions in the OLTP workload that is persistent.

Figure 8:
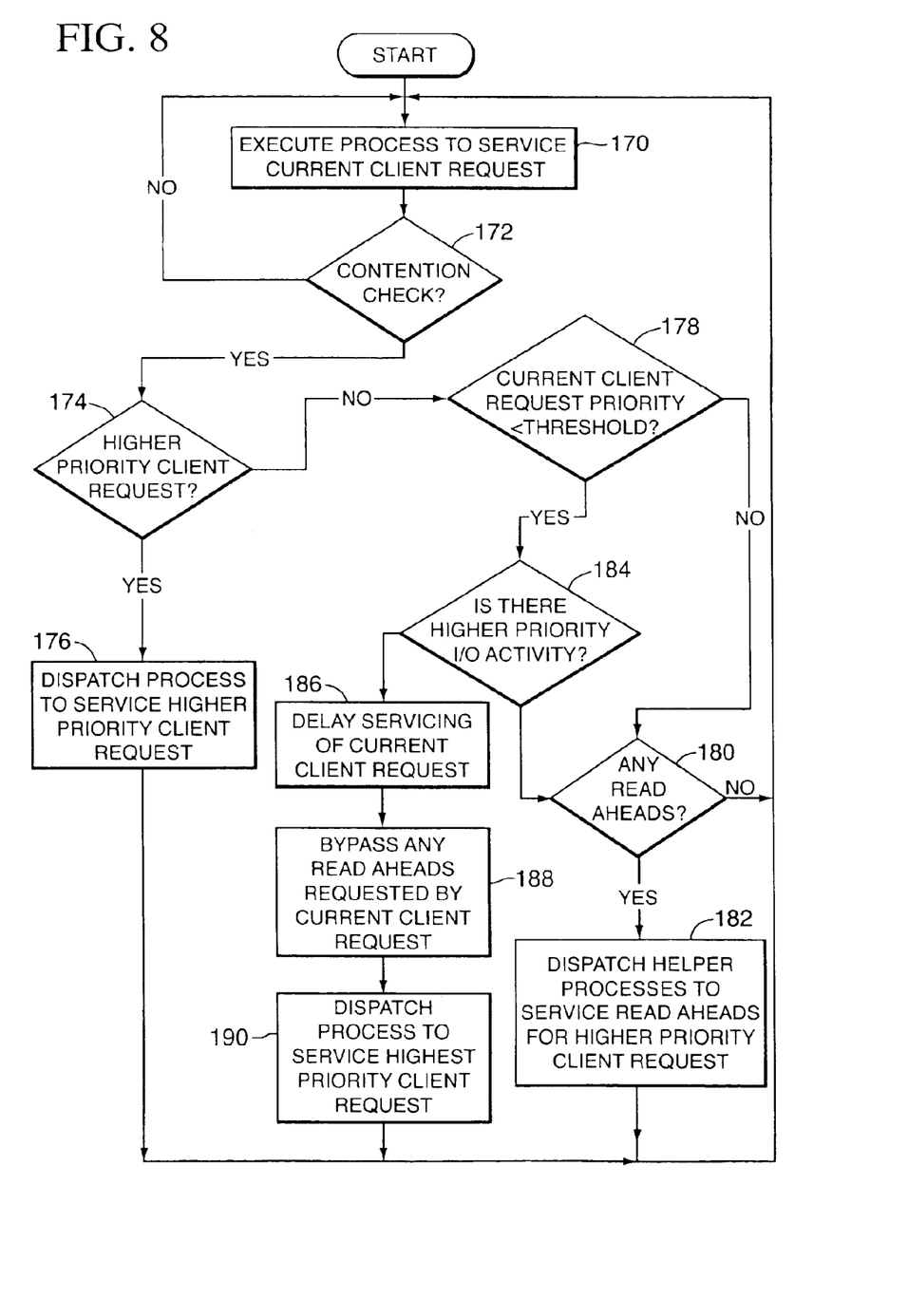
FIG. 8 shows a flow chart of the scheduling process for requests to the disk manager process in accordance with the present invention.

FIG. 8 shows a flow chart of the scheduling process for requests to the disk manager process in accordance with the present invention. While executing a process to service a current client request in step 170, a contention check, in step 172, is performed as before. If there is a higher priority client request as determined in step 174, a process is dispatched, in step 176, onto the CPU in the processing unit to service the higher priority client request.

If there is not a higher priority client request as determined in step 174, a test is performed, in step 178, to determine whether the transaction priority of the current client request is below a given threshold. In one embodiment of the present invention, the threshold is 150 in a range of priorities from 1 to 255.

If the current client request is above the given threshold as determined in step 178, then another test is performed, in step 180, to determine if the current client request requires any read aheads. If not, execution of the process servicing the current client request continues at step 170. If the current client request does require read aheads, then helper processes are dispatched, in step 182, to service the read aheads, and execution of the process to service the current client request then continues at step 170.

If, however, the current client request has a transaction priority that is below the given threshold as determined in step 178, a determination is made, in step 184, as to whether there is any I/O activity currently in progress that is associated with a higher transaction priority client request. If not, a test for read aheads is made, in step 180, and if any are required by the current client request, helper processes are dispatched, in step 182, to service the read aheads and processing of the current client request continues at step 170.

If the current client request has a transaction priority that is below the threshold, as determined in step 178, and if there is I/O activity currently in progress that is associated with a higher transaction priority client request as determined in step 184, then the process servicing the current client request is delayed, in step 186, by a certain amount of time. Delayed client requests are preferably kept on a deferred request queue which is examined for servicing before the normal disk access manager queue 80 in FIG. 3 is examined. Additionally, any read aheads needed by the current client request are not performed, in step 188, and a process for servicing the next client request (the highest priority client request) is dispatched in step 190. The next client request then becomes the current client request, in step 170, and the process that is dispatched to service it is the current process.

The result of this change in scheduling is that current client requests having a priority lower than the threshold are postponed during periods of high I/O activity associated with one or more higher priority requests and thus do not contribute to an increase in the amount of I/O activity above the I/O activity currently in progress. In one version of the present invention, the dispatch of the client request is delayed a fixed amount, preferably 10 milliseconds.

The fixed delay substantially improves response times for the transactions of the OLTP workload when no more than two volumes of a particular processing unit are active. However, if more volumes of the processing unit become active, the fixed delay does not sufficiently improve response times. The larger number of active volumes increases the utilization of the storage subsystem and the CPU in service the read aheads active on those volumes. During relatively long interval of time, say approximately 1 second, a sufficient number of processes are dispatched for client requests having a transaction priority that is lower than the threshold but higher than the transaction priority for read aheads currently in progress on the storage volumes that the I/O activity on the multiple volumes and the CPU time to support that activity rise to the point that the response times of OLTP transaction requests are increased beyond acceptable limits set for the OLTP transaction.

When more than two volumes of a particular processing unit become active, a variable delay substantially improves transaction response times. The formula for the variable delay is changed to be the sum of a fixed delay and a priority dependent delay, (f+k*(priority_threshold-P)), where f is a fixed delay of about 0.2 seconds, k equals approximately 0.02, and the priority threshold is 150 within a range of priorities from 1 to 255. Thus, if the priority of the current client request is 10, processing of the current client request is delayed 3.0 seconds and if the priority of the client request is 150, the client request is delayed 200 milliseconds. Thus, client requests having lower priority can run and issue read aheads only if those requests do not add to the storage device activity for higher priority client requests that are currently in progress.

This strategy assures that response times are minimally affected by lower priority work and provides a mechanism for adjusting the impact. For example, if it is determined that response times are being adversely affected by a lower priority client request such as monitoring query work, then the priority of the MQ work can be lowered. This delays the work for a long time (relative to the typical duration of the OLTP work) and prevents read aheads for the lower priority work from increasing the utilization of the multi-volume storage system. Thus, a tradeoff can be made between the response time of the OLTP work and the requirements of the MQ work.

Figure 9:
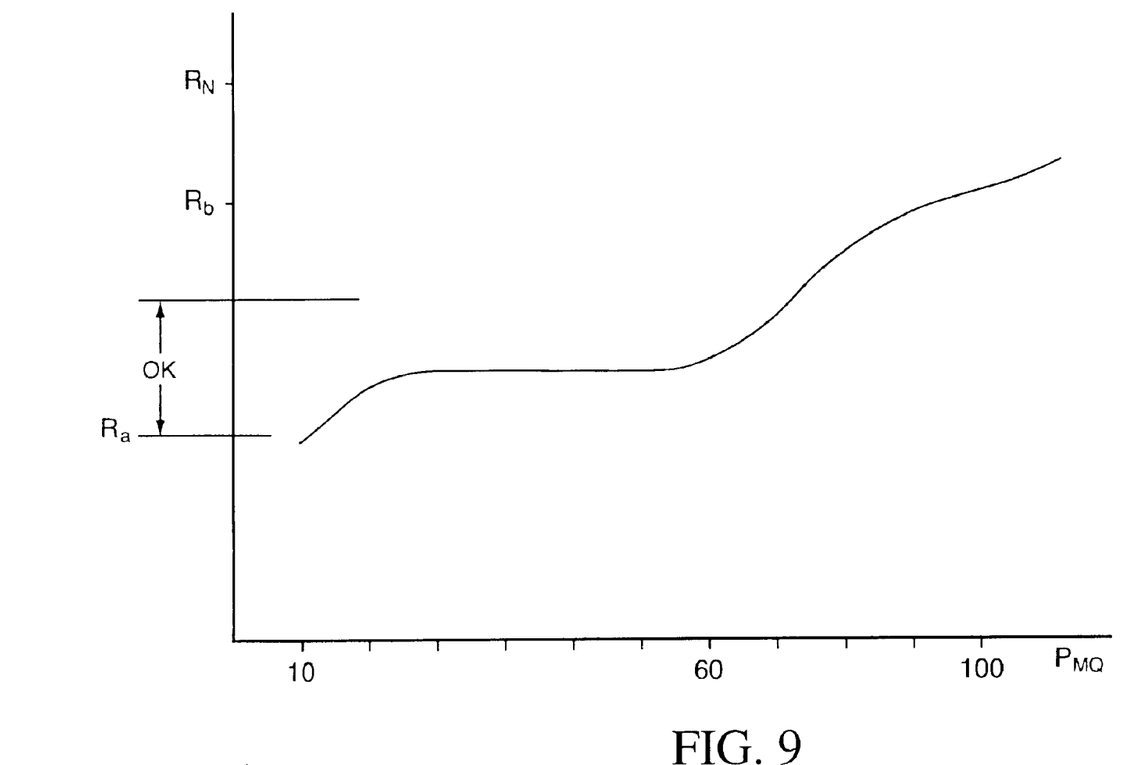
FIG. 9 shows the improvement in response times for the transaction requests according to a second delay formula of the present invention.

FIG. 9 shows the effect on OLTP work response times using the process of FIG. 8, for a range of priorities between 10 and 100 of the MQ workload and a four volume storage system associated with the CPU resource. At a priority of 100, the response time of the OLTP workload is about 70% greater than the response time at a priority of 10, at which priority the OLTP response time is the same as a system only running the OLTP workload. Thus, there is less than a 2× change in response time over a 10× change in priorities and most of the increase occurs beyond a priority of 60.

To further minimize the impact of the lower priority MQ workload on the response times of the OLTP workload, contention checks, which check the input queue of the data access manager process and possibly other queues, are performed once per physical block. Contention checks on a table row basis are not performed. The contention checking is designed to ensure that the checks are performed before the next physical block of data is transferred. This ensures that contention checks find contention before waiting for extra I/O operation to complete.

Additionally, it is desirable to delay work if there is higher priority I/O activity and the client request is below the threshold, but only if the client request is not older than 1 second. Also, a limit on the number of waiting read ahead operations is helpful. In one version of the present invention, no more than 10 concurrent read aheads that are waiting to be issued to the storage system. Furthermore, it is preferable to limit the rate of the read aheads and other storage activity for the MQ workload than to limit the transfer size of a storage request. If a storage request must be performed for the MQ workload and the data is contiguous on the storage device, it is best to use the maximum transfer size to obtain the data. In one version of the present invention, the maximum transfer size is 56K bytes.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of scheduling in a mixed workload environment on a computing system having a CPU resource and a permanent storage resource, the computing system servicing requests from one or more clients, comprising:
   executing a current process on the CPU resource and the storage resource, the current process having been dispatched to service a current client request;
   performing a contention check while executing the current process to determine whether a new client request has a transaction priority that is greater than the transaction priority of the current client request;
   if the transaction priority of the new client request is greater than that of the current request, dispatching a process to service the new client request;
   If the transaction priority of the new request is not greater than that of the current request, determining whether the transaction priority of the current request is less than a predetermined threshold priority;
   if the transaction priority of the current client request is lower than the predetermined threshold priority and there is higher priority I/O activity present on the storage resource:
      delaying the servicing of the current client request and forgoing the servicing of any read aheads for the current client request; and
      dispatching a process to service the highest priority client request that is available for service; and
   if the transaction priority of the current client request is greater than the predetermined threshold or the priority of the current client request is lower than the predetermined threshold and there is no higher priority I/O activity present on the storage resource:
      determining whether the current client request requires any read aheads;
      dispatching one or more helper processes to service any required read aheads; and
      returning to the current process to service the current client request.

2. A method of schedulling in a mixed workload environment as recited in claim 1,
   wherein a maximum priority in the system is 255 and a minimum priority is 1; and
   wherein the threshold priority is 151.

3. A method of scheduling in a mixed workload environment as recited in claim 1, wherein the step of delaying the servicing of the current client request includes
   delaying the servicing of the current client request by an amount of time that depends on the transaction priority of the current client request, higher priority requests being delayed less than lower priority requests, and the amount of the delay being the sum of a fixed delay and a priority dependent delay.

4. A method of scheduling in a mixed workload environment as recited in claim 3,
   wherein a maximum transaction priority in the system 255 and a minimum priority is 1 and the threshold priority is 151;
   wherein the fixed delay is about 0.2 seconds; and
   wherein the priority dependent delay is the product of a constant and the difference between the threshold priority and the priority of the current client request.

5. A method of scheduling in a mixed workload environment as recited in claim 4, wherein the constant is approximately 0.02.

6. A method of scheduling in a mixed workload environment as recited in claim 1, wherein the step of delaying the servicing of the current client request includes delaying the servicing by a fixed delay.

7. A method of scheduling in a mixed workload environment as recited in claim 6, wherein the fixed delay is approximately 10 milliseconds.

8. A method of scheduling in a mixed workload environment as recited in claim 1, wherein the step of performing a contention check occurs once every time a physical block is transferred from the storage resource.

9. A system, comprising:
   a central processing unit ("CPU");
   an interface coupled to the CPU and adapted to receive client requests, said CPU further adapted to:
      execute a current process on the CPU, the current process dispatched to service a current client request;
      determine whether a new client request has a transaction priority that is greater than the transaction priority of the current client request;
      if the transaction priority of the new client request is greater than that of the current request, to dispatch a process to service the new client request;
      if the transaction priority of the new request is not greater than that of the current request, to determine whether the transaction priority of the current request is less than a threshold;
      if the transaction priority of the current client request is lower than the threshold and higher priority input/output ("I/O") activity is present on a storage resource, to delay the servicing of the current client request and to dispatch a process to service the highest priority client request that is available for service; and
      if the transaction priority of the current client request is grater than the threshold or the priority of the current client request is lower than the threshold and no higher priority I/O activity Is present, to determine whether the current client request requires any read aheads and to dispatch one or more helper processes to service any required read aheads.

10. The system of claim 9 wherein the CPU is further configured to delay the servicing of the current request by a variable amount.

11. A system, comprising:
   a central processing unit (CPU) adapted to receive client requests and to:
      execute a current process dispatched to service a current client request;
      determine whether a new client request has a transaction priority that is greater than the transaction priority of the current client request;
      if the transaction priority of the new request is not greater than that of the current request, to determine whether the transaction priority of the current request is less than a threshold; and
      if the transaction priority of the current client request is lower than the threshold and higher priority input/output ("I/O") activity is present on a storage resource, to delay the servicing of the current client request and to dispatch a process to service the highest priority client request that is available for service.

12. The system of claim 11 wherein if the transaction priority of the new client request is greater than that of the current request, the CPU is adapted to dispatch a process to service the new client request.

13. The system of claim 11 wherein if the transaction priority of the current client request is greater than the threshold or the priority of the current client request is lower than the threshold and no higher priority I/O activity is present, the CPU is adapted to determine whether the current client request requires any read aheads and to dispatch one or more helper processes to service any required read aheads.

* * * * *

UNITED STATES PATENT AND TRADEMARK OFFICE
CERTIFICATE OF CORRECTION

| | | |
|---|---|---|
| PATENT NO. | : 6,895,585 B2 | Page 1 of 1 |
| APPLICATION NO. | : 09/823837 | |
| DATED | : May 17, 2005 | |
| INVENTOR(S) | : Gary Stephen Smith | |

It is certified that error appears in the above-identified patent and that said Letters Patent is hereby corrected as shown below:

IN THE CLAIMS

Claim 1, Column 9, line 20, delete "If" and insert therefor --if--

Claim 9, Column 10, line 40, delete "Is" and insert therefor --is--

Signed and Sealed this

Twenty-third Day of June, 2009

JOHN DOLL
*Acting Director of the United States Patent and Trademark Office*